United States Patent
Vijithakumara

(10) Patent No.: US 11,844,005 B2
(45) Date of Patent: Dec. 12, 2023

(54) MESSAGE QUEUING AND CONSOLIDATION IN AN IN VEHICLE ENVIRONMENT

(71) Applicant: TOYOTA MOTOR NORTH AMERICA, INC., Plano, TX (US)

(72) Inventor: Evan A. Vijithakumara, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/135,234

(22) Filed: Dec. 28, 2020

(65) Prior Publication Data

US 2022/0210623 A1 Jun. 30, 2022

(51) Int. Cl.
*H04W 4/48* (2018.01)
*H04W 4/12* (2009.01)
(Continued)

(52) U.S. Cl.
CPC ............. *H04W 4/48* (2018.02); *H04L 51/216* (2022.05); *H04L 51/234* (2022.05); *H04L 51/58* (2022.05); *H04W 4/12* (2013.01)

(58) Field of Classification Search
CPC .......... H04W 4/48; H04W 4/12; H04L 51/38; H04L 51/16; H04L 51/34; H04L 51/066;
(Continued)

(56) References Cited

U.S. PATENT DOCUMENTS 7,603,112 B2 10/2009 Huomo
9,226,121 B2 12/2015 Koum
(Continued)

FOREIGN PATENT DOCUMENTS

EP 2724208 B1 4/2017
KR 20170139141 A 12/2017
WO 2010080156 A1 7/2010

OTHER PUBLICATIONS

Messaging patterns (https://www.enterpriseintegrationpatterns.com/patterns/messaging/MessageRoutingIntro.html) Aug. 17, 2020.
(Continued)

*Primary Examiner* — Johnny B Aguiar
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems, methods, computer-readable media, techniques, and methodologies are disclosed for detecting messages received sequentially in short succession and implementing delivery controls to control a timing of the delivery of content of the messages for presentation to a user. Message detection and delivery control mechanisms disclosed herein refrain from presenting the content of multiple messages received in quick succession until a delivery event condition is detected. Upon detection of the delivery event condition, the content of the messages is consolidated into a message digest that is presented to a user (e.g., an intended recipient of the messages). The consolidated message digest can be presented to the user via an output interface, such as an in-vehicle speaker or display. In this manner, both disruption to the user experience as well as potential safety concerns, particularly in an in-vehicle environment, are mitigated by reducing the number and frequency of messages that are consumed.

1 Claim, 7 Drawing Sheets

(51) Int. Cl.
  *H04L 51/58* (2022.01)
  *H04L 51/216* (2022.01)
  *H04L 51/234* (2022.01)

(58) Field of Classification Search
  CPC ....... H04L 43/16; H04L 67/22; H04L 51/216; H04L 51/234; H04L 51/58
  USPC .................................................. 709/206, 224
  See application file for complete search history.

(56) References Cited

U.S. PATENT DOCUMENTS

| | | | |
|---|---|---|---|
| 9,277,188 | B2 | 3/2016 | Ebrom |
| 9,720,565 | B2 | 8/2017 | Mandre |
| 10,515,070 | B2 | 12/2019 | Strong |
| 10,548,087 | B2 | 1/2020 | Wang |
| 2006/0173959 | A1 | 8/2006 | McKelvie |
| 2011/0142071 | A1* | 6/2011 | Farrell .................... H04L 51/16 370/473 |
| 2011/0281594 | A1* | 11/2011 | Goldberg ................ H04L 51/38 455/466 |
| 2014/0207883 | A1* | 7/2014 | Castellucci ............. H04L 51/16 709/206 |
| 2016/0205054 | A1* | 7/2016 | Lu ........................... H04L 51/32 709/206 |
| 2016/0267792 | A1* | 9/2016 | Nusser ............. G08G 1/096741 |
| 2016/0380959 | A1* | 12/2016 | Abou Mahmoud .... H04L 51/06 709/206 |
| 2017/0155607 | A1* | 6/2017 | Chakra .................. G06F 40/30 |
| 2018/0324128 | A1* | 11/2018 | Bastide .................. H04L 51/06 |

OTHER PUBLICATIONS

SAP integration hub (https://sapintegrationhub.blogspot.com/2019/04/messageaggregation-incpi.html#:~: text=Aggregator%20in%20SAP%20CPI%20is,related%20messages%20has%20been%20received.) Aug. 17, 2020.

What the 'someone is typing' bubbles in messaging apps actually mean (https://gizmodo.com/what-the-someone-is-typing-bubbles-inmessaging-apps-ac-1827744443) Jul. 21, 2018.

* cited by examiner

MESSAGE QUEUING AND CONSOLIDATION IN AN IN VEHICLE ENVIRONMENT

TECHNICAL FIELD

The present disclosure relates generally to sequentially generated and received communications, and in particular, in some implementations, relates to detection and delivery control mechanisms for rapid and sequential text-based communications received in an in-vehicle environment.

DESCRIPTION OF RELATED ART

Text-based communication on mobile devices has become dramatically more user-friendly as cellular phone technology has evolved over the years. The trajectory of this evolution spans phones having only physical numeric keypads, to early smartphones with physical QWERTY keypads, and ultimately to modern day smartphones with virtual QWERTY keypads. The improved user messaging experience provided by modern day mobile devices has led more and more users to shift an increasingly larger percentage of their cellular communication away from voice calls and towards non-voice-based communication such as short message service (SMS) messaging, multimedia messaging service (MMS) messaging, and the like. In some cases, the frequency with which such messages may be received may make it difficult for a user to safely and effectively consume the message content, particularly when the messages are received in an in-vehicle environment.

BRIEF SUMMARY OF THE DISCLOSURE

According to various embodiments of the disclosed technology systems, methods, and computer-readable media for detecting messages received sequentially in short succession and implementing delivery controls to control a timing of the delivery of content of the messages for presentation to a user.

In an example embodiment of the invention, a system includes at least one memory storing machine-executable logic and at least one processor configured to access the at least one memory and execute the machine-executable logic. The at least one processor is configured to execute the machine-executable logic to cause a set of operations to be performed including halting delivery of messages making up a message stream while monitoring for a delivery event condition, consolidating content of the messages into a message digest in response to detection of the delivery event condition, and sending the consolidated message digest to an output device for presentation of the content of the messages via the output device.

In an example embodiment, halting delivery of the messages in the message stream includes placing the messages in a message queue while monitoring for the delivery event condition.

In an example embodiment, the content of the messages is not presented via the output device until the delivery event condition is detected.

In an example embodiment, detecting the delivery event condition includes detecting a communication lull during a first threshold period of time. The communication lull may be detected based on the lack of receipt, during the first threshold period of time, of a signal that indicates an intended communication of an additional message within a communication thread that includes the messages in the message stream.

In an example embodiment, the first threshold period of time is measured from a time of receipt of a most recently received message or from a time of receipt of a most recent signal indicative of intended communication within the same communication thread as the messages in the message stream.

In an example embodiment, the signal that indicates an intended communication of the additional message is a typing awareness signal that indicates i) that the additional message is currently being composed or ii) that there is activity from one or more users in a communication session associated with the communication thread.

In an example embodiment, the typing awareness signal is generated from activity within the communication session that is associated with a first user who generated a most recently received message in the communication thread.

In an example embodiment, the communication session includes a first user who generated a most recently received message in the communication thread and a second user, and the typing awareness signal is generated from activity within the communication session that is associated with the second user.

In an example embodiment, the messages in the message stream include a first message, and halting delivery of the first message while monitoring for the delivery event condition includes determining a time of receipt of the first message and detecting, during a first threshold period of time since the time of receipt of the first message, a signal that indicates an intended communication of a second message subsequent to the first message.

In an example embodiment, detecting the delivery event condition includes determining that a second threshold period of time has elapsed since a time of receipt of a particular message of the messages in the message stream.

In an example embodiment, the time of receipt of the particular message is prior to a respective time of receipt of each other message of the messages in the message stream.

In an example embodiment, the set of operations further includes determining, in response to the second threshold period of time elapsing, that the second message has not been received, where the consolidated message digest is sent to the output device while the signal that indicates an intended communication of the second message continues to be received.

In an example embodiment, the set of operations further includes receiving the second message prior to sending the consolidated message digest to the output device and excluding content of the second message from the consolidated message digest.

In an example embodiment, the output device is a display or a speaker provided in an in-vehicle environment.

In some example embodiments, the above-described system, including any of the aspects and features thereof described herein, may be implemented as an in-vehicle system that includes a programmable circuit configured to implement any of the processing described in connection with the above-described system.

In other example embodiments, the above-described system, including any of the aspects and features thereof described herein, can be implemented as a method and/or a computer program product that includes computer-readable media storing instructions executable by one or more processing units to cause a corresponding method to be performed.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
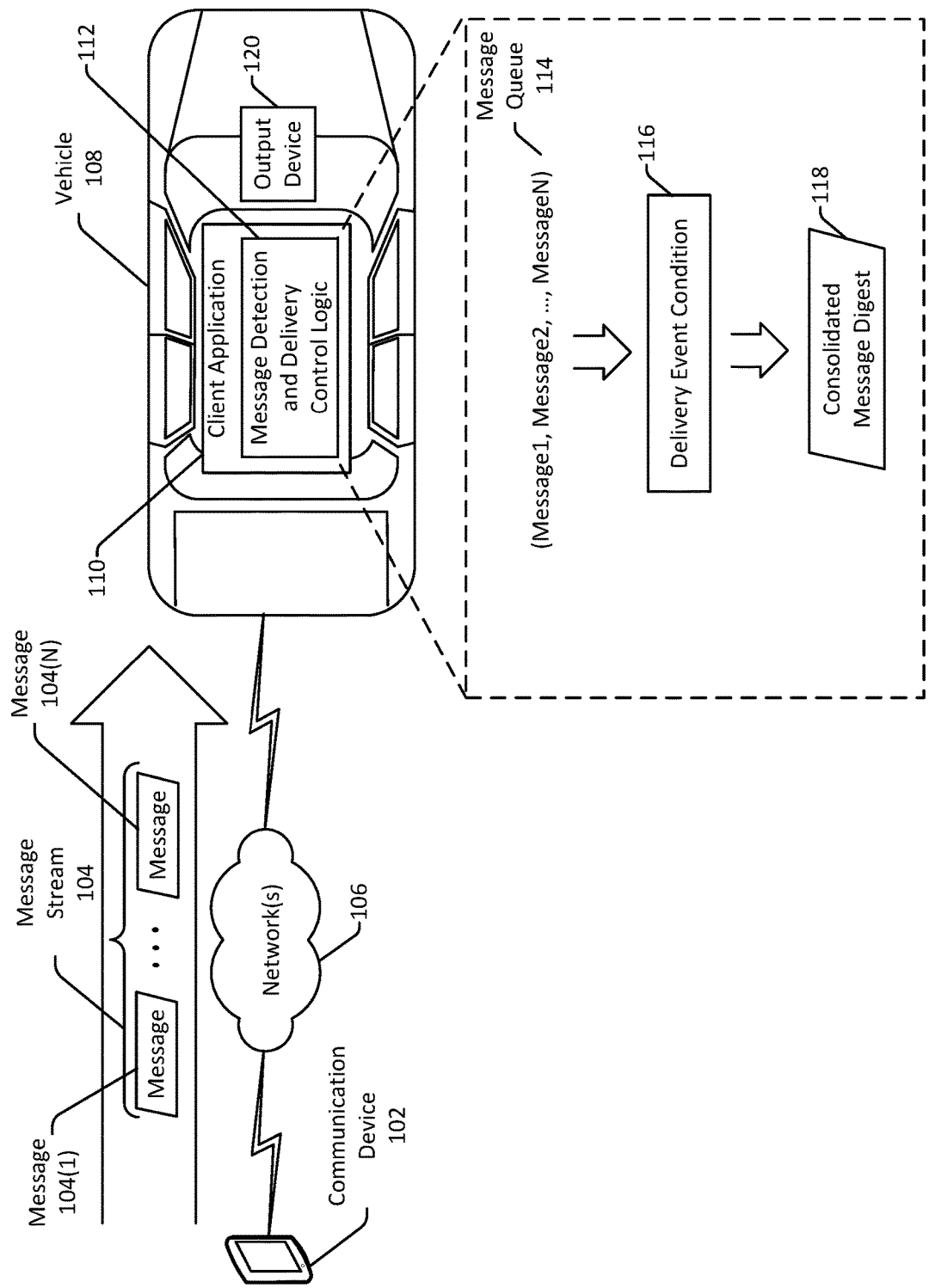
FIG. 1 is a schematic representation of an illustrative message detection and delivery control technique implemented in an in-vehicle environment in accordance with example embodiments of the invention.

The figures are not exhaustive and do not limit the present disclosure to the precise form disclosed.

DETAILED DESCRIPTION

Example embodiments of the invention disclosed herein relate to, among other things, systems, methods, computer-readable media, techniques, and methodologies for detecting messages received sequentially in short succession and implementing delivery controls to control a timing of the delivery of content of the messages for presentation to a user. In particular, example embodiments of the invention provide message detection and delivery control mechanisms that refrain from presenting the content of multiple messages received in quick succession until a delivery event condition is detected. Upon detection of the delivery event condition, the content of the messages may be consolidated into a single message digest that is presented to a user (e.g., an intended recipient of the messages) through an appropriate output interface.

In some example embodiments, the messages are received via a communication interface in an in-vehicle environment and may be presented as voice output via a speaker in the vehicle and/or as text-based output on an in-vehicle display unit. Example embodiments of the invention may be implemented in connection with any of a number of different vehicles and vehicle types including, without limitation, automobiles, trucks, motorcycles, recreational vehicles, or other on- or off-road vehicles. In addition, example embodiments of the invention may be implemented in connection with hybrid electric vehicles, gasoline-powered vehicles, diesel-powered vehicles, fuel-cell vehicles, electric vehicles, or the like.

Example embodiments of the invention are primarily described herein in relation to in-vehicle environments, where technical features of the invention yield both a significantly improved in-vehicle user experience as well as a major public safety advantage. It should be appreciated, however, that embodiments of the invention are not limited to the vehicle context, but can be implemented in connection with any scenario in which multiple discrete messages are received in quick succession, and in which it may be desirable to refrain from delivering the messages until a delivery event condition is met, at which point, the content of the messages may be presented to an intended recipient in a consolidated format.

Thus, example embodiments of the invention are applicable to any scenario in which a user is preoccupied with another task or activity and may become distracted by or otherwise may not be able to, or simply prefers not to, immediately consume multiple discrete messages received in rapid succession. Such scenarios include, for example, meetings during which multiple messages are received on a user's smartphone in quick succession but the user cannot immediately consume them; scenarios in which a user would prefer not to be disturbed by the audible notifications of received messages (e.g., a library environment, while sleeping, while engaged in another activity, etc.); scenarios in which a user expects to receive multiple messages in quick succession but does not assign an urgency to immediately consuming the messages (e.g., casual messages received in a group chat session); and any other applicable scenario. It should be appreciated that the above-described scenarios to which embodiments of the invention are applicable are illustrative and not exhaustive.

In some example embodiments, a message may include any combination of text, graphics (e.g., emojis), images, video, or the like. For instance, a message may be an SMS message that includes only alphanumeric characters; an MMS message that includes multimedia content; a message associated with a proprietary or open-source standard (e.g., iMessage, Rich Communication Services (RCS), etc.); a message generated within a chat-based application (e.g., a WhatsApp™ message, a Facebook™ Messenger message, etc.); an electronic mail message; a message generated on a social media platform; and so forth. In some example embodiments, the message may be a voice message such as a voicemail or a voice memo. It should be appreciated that the above-described types of messages are merely illustrative and not exhaustive. Further, while messages may, at times, be described herein as being text-based communications, or as primarily containing text content, this is merely for ease of explanation, and it should be understood that embodiments of the invention, including any of the features/aspects described herein, can be implemented in connection with messages containing any one or more of text content, video content, image content, graphical content, audible content, or the like.

As cellular phone technology has evolved over the years, the manner in which users employ cellular technology to communicate has also evolved. In particular, as the user interface/user experience for composing messages has improved, users have shifted an increasingly larger percentage of their cellular communication away from voice calls and towards non-voice-based communication. While many users also utilize their smartphones or tablet devices to compose electronic mail messages, the majority of nonvoice-based communication is in the form of text/instant/social media messaging. When users communicate via messaging platforms, there is a general tendency to generate and send a series of messages in quick succession, where each message contains a relatively small amount of content. For instance, it is common for users to compose and send a discrete text or instant message for each independent thought, and it is often the case that each such message includes only a few sentences, or in many cases, a single sentence, sentence fragment or phrase, or even a single word, image, meme, or graphic.

In many scenarios, however, presenting each message of a series of such messages sent in rapid succession, in real-time or near-real-time upon receipt of the message, would be disruptive to the user experience, and in some cases, potentially distracting. For example, in-vehicle systems available today alert a vehicle occupant (e.g., a driver) as each new message is received. Regardless of whether a message notification alert alone or the message content itself is presented, doing so in an in-vehicle environment in real-time or near-real-time upon receipt of the message can distract from a driver's focus on the road. This is true irrespective of whether the message content is presented as voice output after text-to-speech conversion or visually on an in-vehicle display.

Further, while there may be some existing mechanisms for preventing a recipient from being immediately alerted to the presence of message content and/or from immediately being presented with the message content itself, such as a mute function, a do-not-disturb (DND) function, or the like, these functions are disruptive to the user experience in their own right. In particular, even if a recipient elects not to immediately view, listen to, or otherwise consume the message, or even be notified of the receipt of new messages, message notifications would continually stack on top of older notifications, which would make it difficult for a user to understand the context behind the messages or know where to begin interacting with the message content when she ultimately chooses to consume the message content. This, in turn, can exacerbate the safety concerns already associated with consuming message content while operating a motor vehicle.

Example embodiments of the invention address the above-described technical problems that arise when a series of messages are received in quick succession in various scenarios, such as in an in-vehicle environment. In particular, systems, methods, computer-readable media, techniques, and methodologies disclosed herein implement message detection and delivery control protocols that provide technical solutions to the above-described technical problems associated with conventional message receipt and delivery by halting the delivery of messages received sequentially in short succession until a delivery event condition is detected, and upon detecting the presence of such a condition, consolidating the content of the messages into a single message digest that is presented to a message recipient through an appropriate output interface. While message content is described herein as being consolidated into a single message digest for consumption, it should be understood that consolidation of the message content may include any reduction in the number of received messages. For instance, the content of the halted messages may be consolidated into more than one message digest as long as the number of consolidated message digests is less than the number of messages whose content is included in the consolidated digests. Further, in example embodiments, halting the delivery of the messages may include placing the messages in a message queue and refraining from performing one or more of the following functions: delivering the messages to an output device, presenting the messages via an output device, or providing notification(s) of receipt of the messages.

In some example embodiments, detecting the occurrence of a delivery event condition may include detecting a communication lull for a first period of time, where the communication lull may be determined to exist responsive to the failure to detect a signal, during the first period of time, that is indicative of a sender's intent to send another communication subsequent to a most recently received message. In some example embodiments, the first period of time (also referred to herein as a lull time threshold, a lull threshold period of time, a communication lull time threshold, a communication lull threshold period of time, or some other variant thereof) may be measured from a time of receipt of the most recently received message in the same communication thread or from a time of receipt of a most recent signal indicative of a sender's intent to send another message. Further, in some example embodiments, the presence or absence of a communication lull may be determined with respect to a same sender who sent one or more recent messages to the recipient such as in the case of a text or instant message conversation involving only the sender and the recipient. In other example embodiments, the presence or absence of a communication lull may be determined with respect to the same sender or a different sender of a most recent message such as in the case of a group text or a group instant messaging conversation involving multiple participants.

In example embodiments, the signal monitored during the communication lull threshold period of time may be, for example, a typing awareness signal. The typing awareness signal may be a signal that is generated by the sender's messaging application and that indicates that the sender is actively composing a message to the recipient or is exhibiting some level of activity within a communication session involving the sender and the recipient. The sender's messaging application may communicate the typing awareness signal to the recipient's messaging application prior to the sender actually completing the message and initiating transmission of the message to the recipient. Thus, in example embodiments, receipt of a typing awareness signal during the communication lull threshold period of time may result in continued halting of the sequence of received message(s) which form part of the same communication thread as the intended future message indicated by the typing awareness signal. In example embodiments, a message stream including a series of sequentially received messages may be considered to be part of a single communication thread as long as the messages are received in succession without an intervening delivery event condition being detected and as long as the messages are associated with a same communication session. A same communication session may include a point-to-point communication session involving only two users who may alternate between sender and recipient roles or a multi-point communication session involving multiple potential senders and recipients.

In some example embodiments, the delivery event condition may be the expiration of a second period of time, which may be longer than the communication lull threshold period of time. The second period of time may also be referred to herein as a delivery wait time, a delivery wait time threshold, a delivery wait threshold period of time, or some other variant thereof. The second period of time may be measured from a time of receipt of an earliest received message within a given communication thread. In some example embodiments, the sequence of messages forming part of the same communication thread may be consolidated into a single message digest responsive to expiration of the second period of time, even if a typing awareness signal or some other signal is received within the communication lull threshold period of time. That is, in some example embodiments, received messages forming part of a same communication thread may be consolidated into a single message digest and presented to the recipient at the expiration of delivery wait time threshold, even if a signal is received prior to expiration of the delivery wait time threshold that indicates that a sender is composing a new message in the same communication thread. That is, in some example embodiments, the recipient's client application may consolidate and present a recipient with the content of halted messages in a same communication thread upon expiration of the delivery wait time threshold despite being aware of a sender's intent to send a new message in the same communication thread. The new message may then form part of a new communication thread when it is received.

In certain example embodiments, even if the new message is received prior to consolidation of the already received messages into the single message digest and/or prior to delivery of the consolidated message digest to an output device for presentation to the recipient via an output interface of the output device, the content of the new message may nonetheless be excluded from the consolidated message digest as long as the new message is received subsequent to expiration of the delivery wait time threshold. In other example embodiments, if the new message is received prior to generation of the consolidated message digest, its content may be included in the message digest even if the new message is received subsequent to expiration of the delivery wait time threshold. In still other example embodiments, if the new message is received prior to sending the consolidated message digest to an output device, the consolidated message digest may be modified to include the content of the new message despite the message digest having already been generated and despite the new message having been received subsequent to expiration of the delivery wait time threshold.

In addition, in various example embodiments of the invention, the amount of message content included in the consolidated message digest may be reduced by executing semantic processing on the message content to further consolidate/eliminate redundant or semantically similar content. More specifically, semantic processing may be executed on the message content to calculate semantic similarity scores between message pairs. A subset of two or more messages having respective semantic similarity scores that are within a threshold value may be identified and consolidated into a single message. Consolidation of the subset of messages having semantic similarity scores within the threshold value may include selecting only the content of a single one of the messages to include in the consolidated message; including respective portions of two or more messages in the subset in the consolidated message while at the same time discarding redundant portions of the messages; and so forth. In some example embodiments, the consolidated message formed from the content of the subset of messages with semantic similarity scores within the threshold value may be combined with the content of one or more other messages in the same communication thread to form the consolidated message digest that is ultimately sent to the output device for presentation to the message recipient.

As previously noted, embodiments of the invention provide a technical solution to the earlier-described technical problems associated with notifying a recipient of the receipt of and/or presenting the recipient with the content of a series of messages received in quick succession as part of same communication thread, where each such message may include a minimal amount of content. Such technical problems may include a general disruption to the user experience, which in turn, may become exacerbated and potentially introduce significant safety concerns in certain scenarios, such as when the messages are received in an in-vehicle environment, and in particular, when the intended recipient is operating the vehicle.

Example embodiments of the invention dramatically mitigate the level of user disruption caused by receiving a sequence of messages in quick succession by providing a technical solution that halts the delivery and presentation of the message content (which may also include refraining from providing a notification of receipt of the messages) until a delivery event condition is detected, and then, upon detecting the occurrence of such a condition, consolidating the message content into a consolidated format and presenting the message content to the recipient in the consolidated format. Thus, the technical solution provided by example embodiments of the invention addresses the aforementioned technical problems of existing messaging technologies by reducing the frequency of user disruption associated with receipt of messages by both halting delivery/presentation of the messages until a delivery event condition is detected and presenting the message content in a consolidated format when such a condition is detected.

Further, the technical solution provided by embodiments of the invention yields a number of additional technical benefits. For instance, the technical solution disclosed herein does not require the sender to change her behavior in any way. That is, the sender does not need to be requested or informed to compose fewer and longer messages or otherwise alter her messaging behavior in any way. Additionally, the technical solution disclosed herein does not require the message recipient to adjust his mobile device settings or in-vehicle communication settings (e.g., turn on a mute function or a DND function). While these functions may potentially reduce the level of disruption to the message recipient, it would be cumbersome for the user to have to adjust the communication settings to trigger such functions, and not to mention, potentially distracting if done while operating a vehicle. Further, such functions would prevent the user from consuming received message content in a timely manner, which would be undesirable, particularly if the message content is deemed important or relatively urgent. In contrast, although the technical solution disclosed herein calls for temporarily halting the delivery/presentation of messages until a delivery event condition is detected, the use of an overall delivery wait time threshold as a type of delivery event condition ensures that an undesirably long period of time does not pass before the message content is presented to the recipient.

In addition, the technical solution disclosed herein does not require a user to actively decide which senders/conversations to engage a mute or DND function with respect to or when to do so. In particular, the message detection and delivery control functionality disclosed herein can be initiated by a simple toggle on/off function, such that when initiated, the functionality can be applied to each communication thread that is received regardless of the sender(s)/conversation(s) involved. This obviates the need for a user to make individual determinations with respect to the importance (or lack thereof) of communications received from certain senders or as part of certain conversations/communication sessions.

In some example embodiments of the invention, the level of user disruption caused by receipt of electronic messages in rapid succession can be even further mitigated. That is, some example embodiments provide the added technical benefit of reducing not only the number of messages presented to the user (e.g., presenting a consolidated message digest in lieu of a series of messages) and the frequency with which the reduced number of messages are presented, but also reducing the amount of message content presented to the user. This is achieved by the technical solution disclosed herein of executing semantic processing on received message content to identify subsets of messages having semantic similarity scores that are close enough to justify consolidating the message content and discarding redundant content. Thus, in these example embodiments, the message content included in the consolidated message digest presented to a user may actually include less than the total message content received due to the elimination of redundant or otherwise low-value content. In this manner, the disruption to the user experience is further mitigated because the user can consume less content without any or with only a marginal loss of meaning/context. In addition, the presentation in consolidated message digest form may be generated in a manner that also preserves the underlying message content as originally received. When the underlying messages are preserved, it remains possible for the user to revert back to the original individual message view at any time. Various technical features and aspects of embodiments of the invention that yield the above-described technical solutions and their resulting technical benefits will now be described in more detail in reference to the Figures and the illustrative embodiments depicted therein.

FIG. 1 is a schematic representation of an illustrative message detection and delivery control technique implemented in an in-vehicle environment in accordance with example embodiments of the invention. FIG. 3 is a flowchart of an illustrative method 300 for message detection and delivery control in accordance with example embodiments of the invention. FIGS. 1 and 3 will be described in conjunction with one another hereinafter, while also referencing, as appropriate FIGS. 2A and 2B.

Referring now to FIGS. 1 and 3, at block 302 of the method 300, a client application 110 may receive, via one or more communication networks 106 over a period of time, a message stream 104 containing a series of discrete messages 104(1)-104(N), where N is any integer greater than 1. In example embodiments, the series of messages 104(1)-104(N) may be sequentially generated at a communication device 102 and sequentially transmitted to the client application 110 via the communication network(s) 106. For example, a user may utilize a client application (not shown) executing on the communication device 102 to generate the message and transmit it to the client application 110.

In example embodiments, the communication device 102 may be a mobile device such as a smartphone, a tablet, a wearable computing device, or the like; a desktop computer; a laptop computer; a gaming console; or any other device which can be used to compose and send messages containing text content, multimedia content, and/or graphical content. The client application executing on the communication device 102—which may be used to generate and send the messages 104(1)-104(N)—may utilize the standardized SMS/MMS cellular messaging communication protocol; a native and open-source cellular messaging communication protocol (e.g., RCS); a proprietary cellular messaging communication protocol (e.g., iMessage); and so forth. Alternatively, the client application used to generate the messages 104(1)-104(N) may be a messaging application that relies on Internet Protocol (IP) telephony communication protocols to transmit messages over the Internet. More generally, the client application executing on the communication device 102 may be a mobile application, a web-based application, or the like. In still other example embodiments, the client application used to generate the message stream 104 may be a native electronic mail client, a web-based electronic mail client, or the like.

The client application 110 may execute on a mobile device associated with a user in the vehicle 108 such as a driver or other occupant of the vehicle 108. For instance, the mobile device on which the client application 110 is executing may be communicatively coupled to an in-vehicle system such as an in-vehicle infotainment (IVI) system, such that messages received by the client application 110 can be presented on a display of the IVI system. Additionally, or alternatively, the content of messages received by the client application 110 can be converted to speech and outputted via a speaker system in the vehicle 108. In certain example embodiments, graphical content may be converted to descriptive speech that conveys the nature/meaning of the graphical content. In some example embodiments, the client application 110 may execute directly on an in-vehicle system. The client application 110 may include any of the types of applications described earlier in relation to the client application (not shown) executing on the communication device 102 (i.e., the application used to generate the messages 104(1)-104(N)).

The network(s) 106 may include, but are not limited to, any one or more different types of communication networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 106 can have any suitable communication range associated therewith and can include, for example, global networks (e.g., the Internet), metropolitan area networks (MANS), wide area networks (WANs), local area networks (LANs), or personal area networks (PANS). In addition, the network(s) 106 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In some example embodiments, the messages 104(1)-104(N) that make up the message stream 104 may be sent as part of a point-to-point communication session between the sender of the messages 104(1)-104(N) (e.g., a user of the communication device 102) and an intended recipient of the messages 104(1)-104(N) (e.g., a driver or other occupant of the vehicle 108). For instance, the messages 104(1)-104(N) may be sent by a sender to a recipient as part to a text or chat messaging conversation between only the sender and the recipient. In other example embodiments, the messages 104(1)-104(N) may be sent by multiple senders using multiple instances of a client application executing on multiple communication devices as part of, for example, a group messaging conversation that also includes the recipient (e.g., the driver or other occupant of the vehicle 108). In the case of a multi-point communication session)(e.g., a group chat), the messages 104(1)-104(N) may be sent by multiple different senders, with each message being transmitted from the respective sender of the message to each other participant in the group communication session.

In example embodiments, the client application 110 may execute message detection and delivery control logic 112 to implement the message detection and delivery control techniques disclosed herein. The logic 112 may be embedded in the source code of the client application 110, which as previously noted, may be a mobile application, a web-based application, a native device application, or the like. In some example embodiments, the logic 112 may be provided in the form of a web browser plugin, a browser extension, an application add-on, or the like.

Figure 2A:
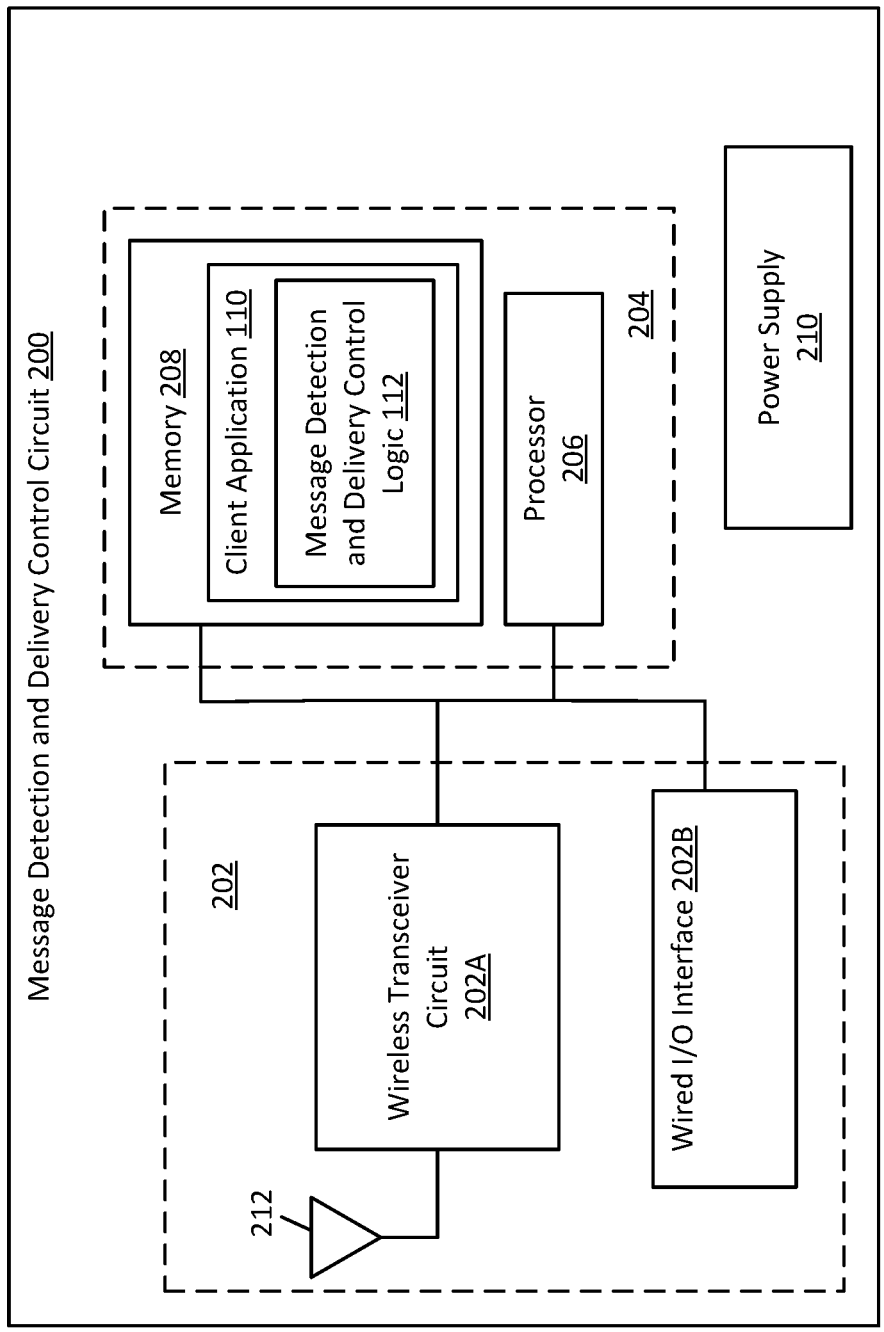
FIG. 2A illustrates an example circuit architecture for implementing message detection and delivery control techniques in accordance with example embodiments of the invention.
Figure 3:
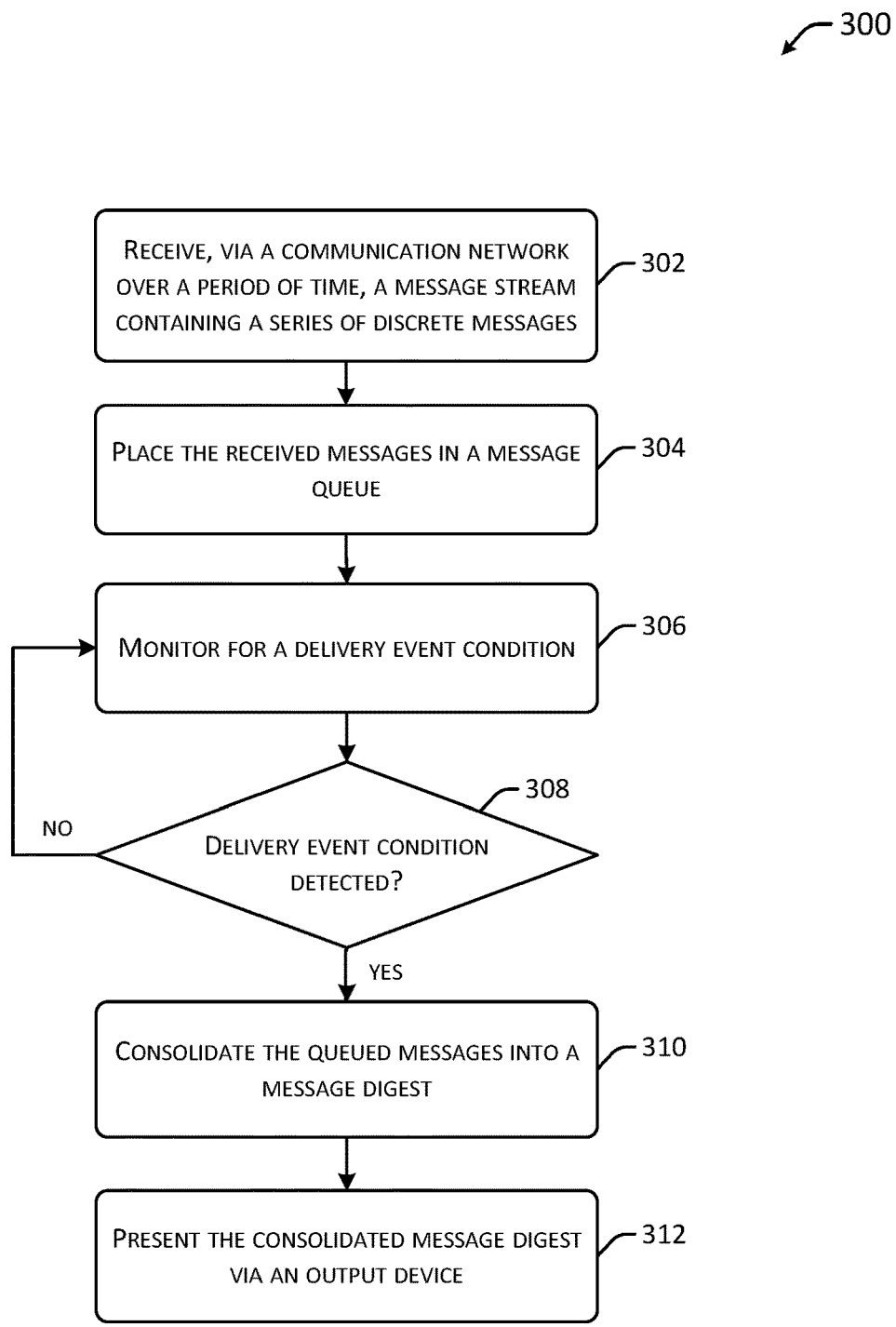
FIG. 3 is a flowchart of an illustrative method for message detection and delivery control in accordance with example embodiments of the invention.

In some example embodiments, a message detection and delivery control circuit, such as the example circuit 200 depicted in FIG. 2A, may be provided in the vehicle 108. The circuit 200 may be configured to execute the client application 110 and the message detection and delivery control logic 112. Message detection and delivery control circuit 200 can be implemented as an electronic control unit (ECU) or as part of an ECU. In other example embodiments, the message detection and delivery control circuit 200 can be implemented independently of an ECU.

Message detection and delivery control circuit 200 includes a communication circuit 202, a decision circuit 204 (including a processor 206 and a memory 208 in this example) and a power supply 210. Components of message detection and delivery control circuit 200 are illustrated as communicating with each other via a data bus, although other communication interfaces are contemplated. Although not depicted in FIG. 2A, the message detection and delivery control circuit 200 may include a switch (physical or virtual) that allows a user to toggle the message detection and delivery control functionality disclosed herein on and off.

Processor 206 can include a graphical processing unit (GPU), a central processing unit (CPU), a microprocessor, or any other suitable processing unit or system. The memory 208 may include one or more various forms of memory or data storage (e.g., flash memory, random access memory (RAM), etc.) onto the client application 110 and the logic 112 can be loaded for execution by the processor 206. Memory 208, can be made up of one or more modules of one or more different types of memory, and may be configured to store data and other information as well as operational instructions that may be used by the processor 206 to implement the message detection and delivery control circuit 200.

Although the example of FIG. 2A is illustrated using processor and memory circuitry, as described below with reference to circuits disclosed herein, decision circuit 204 can be implemented utilizing any form of circuitry including, for example, hardware, software, firmware, or any combination thereof. By way of further example, one or more processors; controllers; application specific integrated circuits (ASICs); programmable logic array (PLAs) devices; programmable array logic (PAL) devices; complex programmable logic devices (CPLDs); field programmable gate arrays (FPGAs); logical components; software routines; or other mechanisms might be implemented to make up a message detection and delivery control circuit 200. Similarly, in some example embodiments, the logic 112 can be implemented in any combination of software, hardware, or firmware.

Communication circuit 202 may include a wireless transceiver circuit 202A with an associated antenna 212 and/or a wired input/output (I/O) interface 202B with an associated hardwired data port (not illustrated). As this example illustrates, communications with the message detection and delivery control circuit 200 can include wired and/or wireless communications. Wireless transceiver circuit 202A can include a transmitter and a receiver (not shown) to allow wireless communications via any of a number of communication protocols such as, for example, an 802.11 wireless communication protocol (e.g., WiFi), Bluetooth, near field communications (NFC), Zigbee, or any of a number of other wireless communication protocols whether standardized, proprietary, open, point-to-point, networked or otherwise. Antenna 212 is coupled to wireless transceiver circuit 202A and is used by wireless transceiver circuit 202A to transmit radio frequency (RF) signals wirelessly to wireless equipment with which it is connected and to receive radio signals as well. These RF signals can include information of almost any sort that is sent or received by message detection and delivery control circuit 200 to/from other entities such as vehicle sensors (not shown), other vehicle systems (not shown), an external communication device of a sender (e.g., FIG. 1, device 102), or the like.

Wired I/O interface 202B can include a transmitter and a receiver (not shown) for hardwired communications with other devices. For example, wired I/O interface 202B can provide a hardwired interface to other components, including vehicle sensors or other vehicle systems. Wired I/O interface 202B can communicate with other devices using Ethernet or any of a number of other wired communication protocols whether standardized, proprietary, open, point-to-point, networked or otherwise.

Power supply 200 can include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

In example embodiments, the message detection and delivery control logic 112 may include one or more program modules, each of which may be configured to perform a specialized set of tasks in connection with implementing the message detection and delivery control protocols embodied by the logic 112. For instance, referring now to FIG. 2B, the message detection and delivery control logic 112 may include a message queue management module 214 configured to execute processing to halt delivery/presentation of messages received in quick succession as part of a same communication thread (e.g., the messages 104(1)-104(N) in the message stream 104) by, for example, placing incoming messages in a message queue until a delivery event condition is detected. The message detection and delivery control logic 112 may further include a delivery event condition monitoring module 116 configured to execute processing to monitor for and detect the occurrence of a delivery event condition. The message detection and delivery control logic 112 may still further include a message digest generation module 218 configured to, responsive to detection of a delivery event condition, execute processing to generate a consolidated message digest from the content of the queued messages.

Figure 2B:
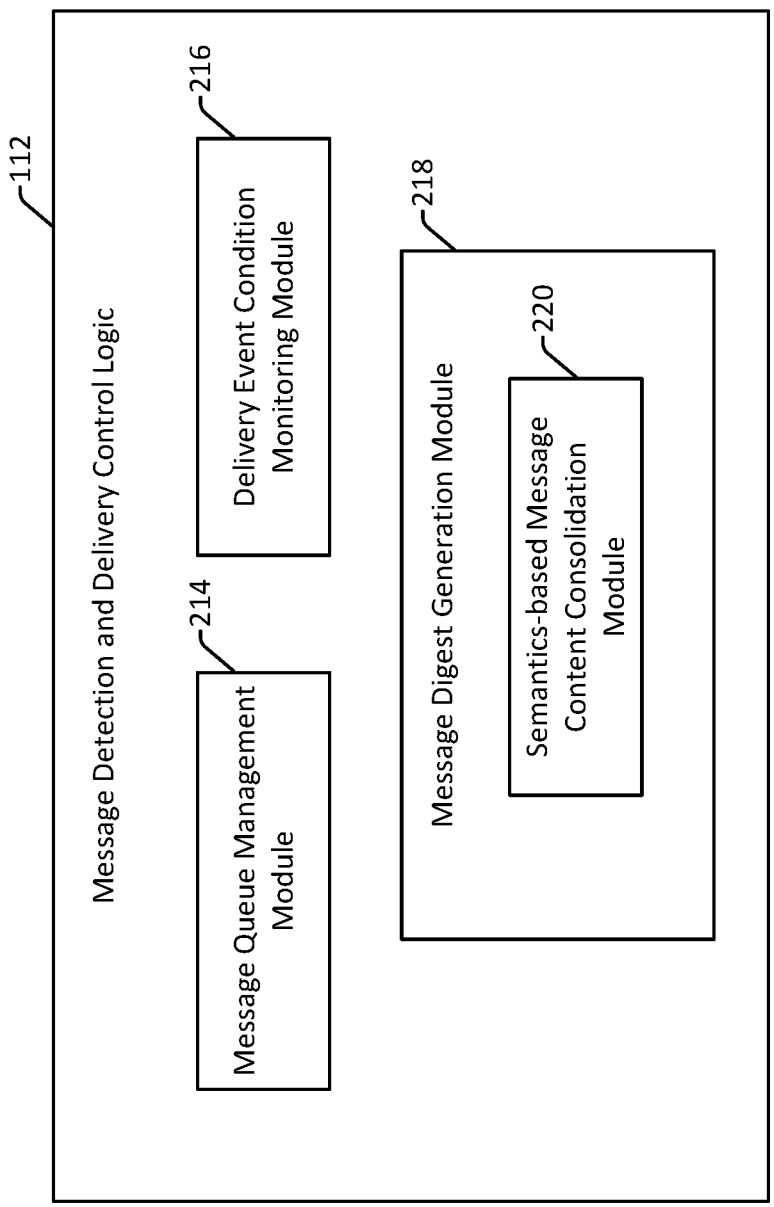
FIG. 2B illustrates example message detection and delivery control logic in accordance with example embodiments of the invention.

The message digest generation module 218 may further include a semantics-based message content consolidation sub-module 220, which may be configured to execute processing to determine the semantic similarity between the content of different messages within a same communication thread and consolidate the content of messages determined to have a semantic similarity within a similarity threshold. Consolidating semantically similar messages may include discarding redundant content between the messages. Consolidating semantically similar messages may also include summarizing related content between the messages—as a non-limiting example, indicating the names of the three members of a group chat that responded yes to a user query as opposed to three independent yes responses. It should be appreciated that the number of modules and the tasks associated with each module depicted in FIG. 2B are merely illustrative and not restrictive. The message detection and delivery control logic 112 may include more or fewer modules than what is depicted in FIG. 2B, and the partitioning of processing between the modules may vary. Further, any module depicted as a sub-module of another module may instead be a standalone module, or vice versa. Moreover, each module may be implemented in software as computer/machine-executable instructions or code; in firmware; in hardware as hardwired logic within a specialized computing circuit such as an ASIC, FPGA, or the like; or as any combination thereof. It should be understood that any description herein of a module or a circuit performing a particular task or set of tasks encompasses the task(s) being performed responsive to execute of machine-executable instructions of the module and/or hardwired logic of the module.

Referring again to FIG. 3, at block 304 of the method 300, the message queue management module 214 may halt immediate delivery/presentation of the received messages 104(1)-104(N) until a delivery event condition 116 is detected. More specifically, the message queue management module 214 may determine that the messages 104(1)-104(N) of the message stream 104 form part of the same communication thread, and then halt delivery/presentation of the messages 104(1)-104(N) to the intended recipient until being notified of the occurrence of the delivery event condition 116 by the delivery event condition monitoring module 216. In example embodiments, the message queue management module 214 may determine that the messages 104(1)-104(N) in the message stream 104 are part of the same communication thread as long as the messages 104(1)-104(N) are received in succession without an intervening delivery event condition being detected and as long as the messages are associated with a same communication session. A same communication session may include a point-to-point communication session (e.g., an individual text conversation) involving only two users who may alternate between sender and recipient roles or a multi-point communication session involving multiple potential senders and recipients (e.g., a group chat conversation).

In example embodiments, the message queue management module 214 may halt delivery/presentation of the messages 104(1)-104(N) by placing them in the message queue 114 and refraining from sending the message content to an output device 120 (e.g., a speaker, a display, a haptic output device, etc.), thereby preventing presentation of the message content via an output interface of the output device 120. In some example embodiments, refraining from delivering the message content of the messages 104(1)-104(N) to the output device 120 may also include refraining from providing the message recipient with notifications (e.g., visual, audible, haptic, etc.) of receipt of the messages 104(1)-104(N). The term output interface may be used herein at times to describe the form of output provided by the output device 120. For instance, if the output device 120 is a speaker, the output interface may be considered to be an audible output interface; if the output device 120 is a display, the output interface is a visual output interface; and if the output device 120 is a haptic feedback device, the output interface is a haptic output interface.

Referring again to FIG. 3, at block 306 of the method 300, the delivery event condition monitoring module 216 may monitor for the delivery event condition 116. Example types of delivery event conditions 116 will be described in more detail in reference to the illustrative method of FIG. 4. While monitoring for the delivery event condition 116, the delivery event condition monitoring module 216 may periodically assess at block 308 of the method 300, in accordance with preconfigured criteria, whether the delivery event condition 116 has been detected. In example embodiments, the preconfigured criteria may relate to how a delivery event condition is defined.

As long as no delivery event condition is detected (a negative determination at block 308), the delivery event condition monitoring module 216 may continue to monitor for an occurrence of the delivery event condition 116. While monitoring for the occurrence of the delivery event condition 116, additional messages forming part of the same communication thread as the message stream 104 may be received, in which case, the message queue management module 214 may also halt delivery/presentation of any such messages and place them in the message queue 114 along with the already received messages. In response to the occurrence of the delivery event condition 116 being detected (a positive determination at block 308), the message digest generation module 218 may consolidate the content of the messages in the message queue 114 that form part of the same communication thread into a consolidated message digest 118, at block 310 of the method 300. Then, at block 312 of the method 300, the message digest generation module 218 may send the consolidated message digest 118 to the output device 120 for presentation by the output device 120 to an intended recipient of the message content (e.g., a driver of the vehicle 108). In this manner, minimal disruption to the message recipient's user experience results because the number of messages and the frequency with which notification of their receipt/presentation of their content occurs is reduced.

Figure 4:
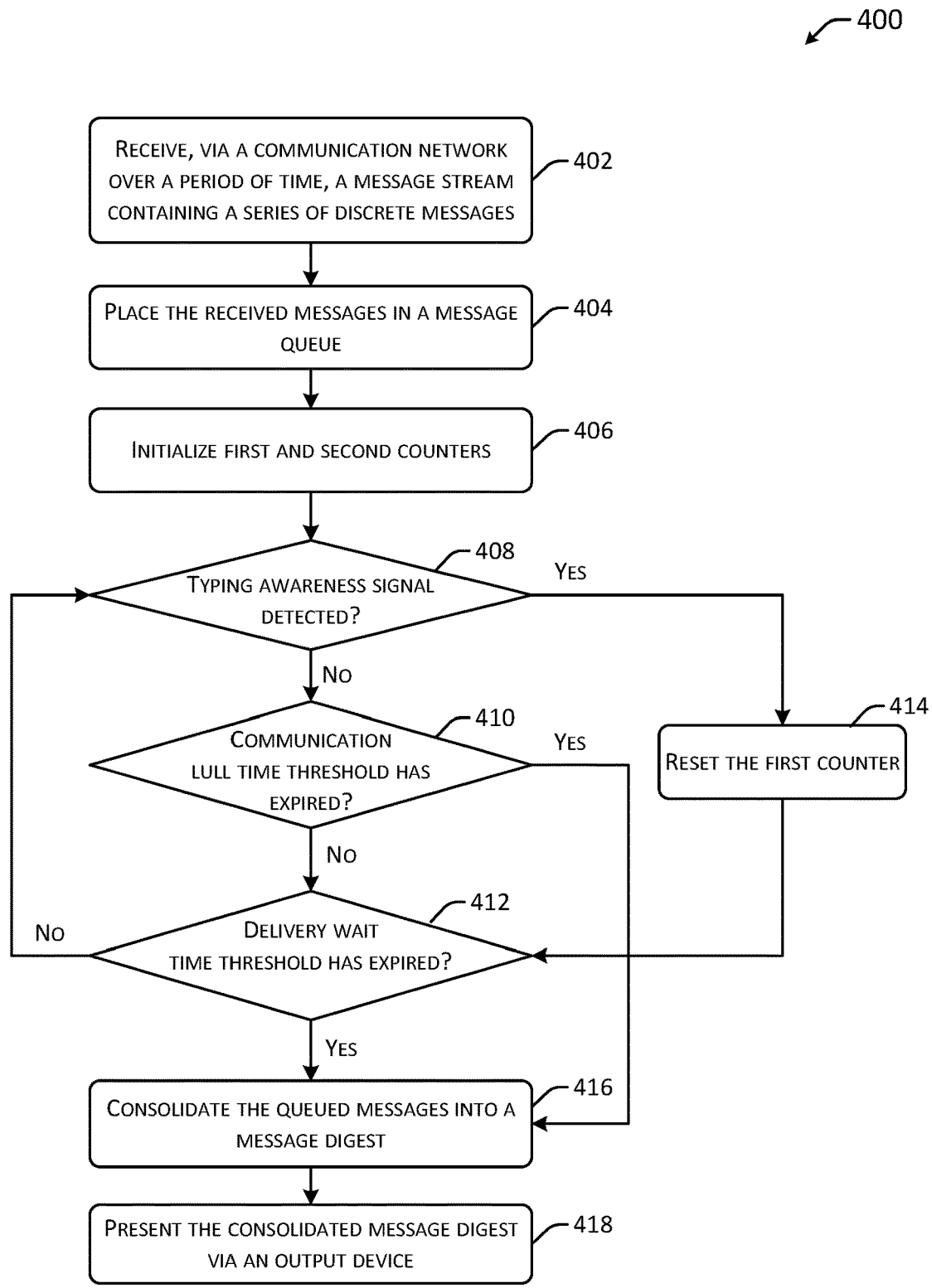
FIG. 4 is a flowchart of an illustrative implementation of the method of FIG. 3 in accordance with example embodiments of the invention.

A more specific implementation of the example method 300 will now be described in relation to the example method 400 depicted in the flowchart of FIG. 4. In example embodiments, the steps at blocks 402 and 404 may involve similar processing as the steps at block 302 and 304 of the method 300 of FIG. 3. Further, one or more of the steps at blocks 406, 408, 410, 412, and 414 may represent a specific implementation of the processing performed at blocks 306 and 308 of the method 300 of FIG. 3.

Referring now to block 406 of the method 400, the message detection and delivery control circuit 200 may initialize first and second counters. In some example embodiments, the first and second counters may be each initialized to zero. The first and second counters may then be incremented and compared against a communication lull threshold period of time and a delivery wait threshold period of time, respectively, as part of determining whether a delivery event condition has occurred, as described in more detail hereinafter. The communication lull threshold period of time and the delivery wait threshold period of time may be values that are preconfigurable and modifiable by a user. In other example embodiments, the first counter may be initialized to a first period of time representing the communication lull threshold period of time, and the second counter may be initialized to a second period of time representing the overall delivery wait threshold period of time, in which case, the counters may be decremented and may be indicative of the occurrence of a delivery event condition when either counter reaches zero, as described in more detail hereinafter. In some example embodiments, the second period of time may be longer than the first period of time, and as such, the first counter may be reset more frequently than the second counter. In still other example embodiments, one of the first counter or the second counter may be initialized to zero and the other counter may be initialized to the communication lull threshold period of time or the delivery wait threshold period of time, whichever the case may be.

Referring now to block 408 of the method 400, the delivery event condition monitoring module 216 may determine whether a typing awareness signal has been detected during the communication lull threshold period of time being tracked by the first counter. The typing awareness signal may be a signal indicative of a sender's intent to send another communication subsequent to a most recently received message within the same communication thread. For instance, the typing awareness signal may be a signal that is generated by the sender's messaging application (e.g., a client application executing on the communication device 102) and that indicates that the sender is actively composing a message to the recipient or is exhibiting some level of activity within a communication session involving the sender and the recipient. The sender's messaging application may communicate the typing awareness signal to the recipient's messaging application (e.g., the client application 110) prior to the sender actually completing the message and initiating transmission of the message to the recipient.

As previously noted, the delivery event condition monitoring module 216 may monitor for the typing awareness signal as the first counter tracks the progression of the communication lull threshold period of time. In some example embodiments, the communication lull threshold period of time may initially be measured from a time of receipt of the most recently received message in the same communication thread. That is, the first counter may be initialized upon receipt of the most recently received message in the same communication thread. Further, in example embodiments, the first counter may be reset (i.e., the communication lull threshold time period may be measured again from the beginning of the time period) responsive to detection of a typing awareness signal. For instance, responsive to detection of a typing awareness signal during the communication lull threshold time period (a positive determination at block 408), the delivery event condition monitoring module 216 may reset the first counter at block 414 of the method 400. Thus, in example embodiments, receipt of a typing awareness signal during the communication lull threshold time period may result in continued halting of the sequence of received messages (e.g., messages 104(1)-104(N)), which form part of the same communication thread as the intended future message indicated by the typing awareness signal, as long as other delivery event condition(s) are not detected.

Further, in some example embodiments, the presence or absence of a communication lull may be determined with respect to a same sender who sent one or more recent messages to the recipient such as in the case of a text or instant message conversation involving only the sender and the recipient. In other example embodiments, the presence or absence of a communication lull may be determined with respect to the same sender or a different sender of a most recent message such as in the case of a group text or a group instant messaging conversation involving multiple participants.

If, on the other hand, a typing awareness signal is not detected at block 408, the method 400 proceeds to block 410, where the delivery event condition monitoring module 216 determines whether the communication lull threshold time period has expired. Depending on how the first counter is initialized, the determination at block 410 may include determining whether the first counter has expired (if the first counter is initialized to the communication lull threshold period of time and then decremented therefrom) or determining whether the first counter has reached the communication lull time threshold value that represents the communication lull threshold period of time (if the first counter is initialized to zero and incremented therefrom). In some example embodiments, the communication lull threshold period of time may be between 5-10 seconds, for example.

If the delivery event condition monitoring module 216 determines that the communication lull threshold has not yet expired (a negative determination at block 410), the method 400 proceeds to block 412, where the module 216 determines whether another delivery event condition has occurred, specifically whether the delivery wait threshold time period has expired. Depending on how the second counter is initialized, the determination at block 412 may include determining whether the second counter has expired (if the second counter is initialized to the delivery wait threshold period of time and then decremented therefrom) or determining whether the second counter has reached the delivery wait time threshold value that represents the delivery wait threshold period of time (if the second counter is initialized to zero and incremented therefrom). As previously noted, the delivery wait threshold time period may be longer than the communication lull threshold time period, and may, in some example embodiments, be measured from a time of receipt of an earliest received message within a given communication thread. For instance, if the communication lull threshold time period is between 5-10 seconds, the delivery wait threshold time period may be between 45-60 seconds. It should be appreciated that these time period values are merely illustrative and not restrictive.

In example embodiments, the delivery wait threshold time period may serve to ensure that messages are not queued and their delivery halted for an unreasonably long period of time. That is, the delivery wait threshold time period may be a length of time that is preconfigured to be a cut-off point at which message delivery is no longer halted and the content of the halted messages within a given communication thread are consolidated for delivery to the recipient. In particular, in response to a positive determination at block 412 indicating that the delivery wait threshold time period has expired, and thus, that occurrence of the delivery event condition 116 has been detected, the message digest generation module 218 consolidates the content of the halted messages within a given communication thread (e.g., messages 104(1)-104(N)) into a consolidated message digest (e.g., consolidated digest 118) at block 416 of the method 400. Then, at block 418 of the method 400, the message detection and delivery control circuit 200 sends the consolidated message digest to an output device (e.g., output device 120), and the output device presents the consolidated digest to the intended recipient via a corresponding output interface.

In example embodiments, the method 400 also proceeds to block 412 from block 414. That is, responsive to detecting a typing awareness signal at block 408, and resetting the first counter at block 414 (i.e., resetting the communication lull time period) in response thereto, the method 400 proceeds to block 412 to determine if another delivery event condition has occurred (i.e., expiration of the delivery wait threshold time period). If the delivery wait threshold time period has expired (a positive determination at block 412), the method 400 proceeds to block 416, where the consolidated message digest is generated, as described earlier. Thus, in some example embodiments, the sequence of halted messages (e.g., messages 104(1)-104(N)) forming part of the same communication thread may be consolidated into the message digest (e.g., consolidated message digest 118) at block 416, responsive to a determination that the delivery wait threshold time period has expired at block 412, even if a typing awareness signal or some other signal is received within the communication lull threshold period of time.

That is, in some example embodiments, received messages forming part of a same communication thread may be consolidated into a single message digest and presented to the recipient at the expiration of delivery wait time threshold, even if a signal is received prior to expiration of the delivery wait time threshold that indicates that a sender is composing a new message in the same communication thread. More specifically, in some example embodiments, the recipient's client application (e.g., client application 110) may consolidate and present a recipient with the content of halted messages in a same communication thread upon expiration of the delivery wait time threshold despite being aware of a sender's intent to send a new message in the same communication thread. The new message may then form part of a new communication thread when it is received.

In certain example embodiments, even if the new message is received prior to consolidation of the already received messages into the single message digest and/or prior to delivery of the consolidated message digest to an output device for presentation to the recipient, the content of the new message may nonetheless be excluded from the consolidated message digest as long as the new message is received subsequent to expiration of the delivery wait time threshold. In other example embodiments, if the new message is received prior to generation of the consolidated message digest, its content may be included in the message digest even if the new message is received subsequent to expiration of the delivery wait time threshold. In still other example embodiments, if the new message is received prior to sending the consolidated message digest to an output device, the consolidated message digest may be modified to include the content of the new message despite the message digest having already been generated and despite the new message having been received subsequent to expiration of the delivery wait time threshold.

Referring again to block 412, if, on the other hand, the delivery event condition monitoring module 216 determines that the delivery wait threshold time period has not expired (a negative determination at block 412), the method 400 may again proceed from block 408, where the module 216 checks for receipt of a typing awareness signal. The method 400 may proceed iteratively in this manner until a delivery event condition is detected such as the absence of a typing awareness signal or other signal indicative of a sender's intent to send another message during the communication lull threshold time period, expiration of the delivery wait threshold time period, or the occurrence of another delivery event condition.

It should be appreciated that the delivery event conditions disclosed herein are illustrative and not exhaustive. For instance, other delivery event conditions that may trigger generation of the consolidated message digest include a threshold number of messages having been received within a given communication thread, a threshold amount of content (e.g., a threshold number of characters) included in the received messages, and so forth. It should also be appreciated that the processing at blocks 306 and 308 of example method 300 (as well as the specific example implementation of that processing at blocks 406, 408, 410, 412, and 414 of method 400) may be performed with respect to each communication thread and may be initiated upon receipt of a first message within a given communication thread. That is, while the processing associated with monitoring for a delivery event condition is described and depicted as occurring subsequent to receipt of a message stream and halting (e.g., queuing) of the received messages, it should be understood that the delivery event condition monitoring processing may be initiated upon receipt of a first message within a communication thread, and that the halting of messages received within that communication thread while no delivery event condition is detected may occur in parallel with the delivery event condition monitoring processing.

Figure 5:
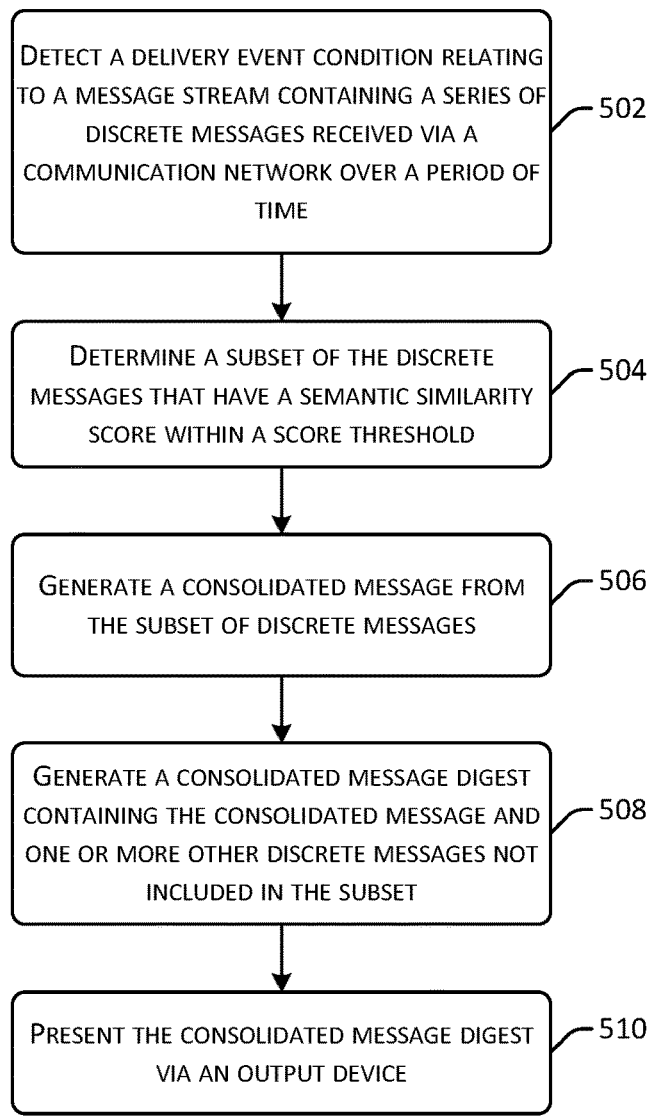
FIG. 5 is a flowchart of an illustrative method for consolidating messages received in a message stream based on semantic characteristics of the messages in accordance with example embodiments of the invention.

FIG. 5 is a flowchart of an illustrative method 500 for consolidating messages received in a message stream based on semantic characteristics of the messages in accordance with example embodiments of the invention. In particular, the example method 500 provides a technique for reducing the amount of message content included in the consolidated message digest by executing semantic processing on the message content to further consolidate/eliminate redundant or semantically similar content.

Referring now to FIG. 5 in reference to FIG. 2B, at block 502 of the method 500, the delivery event condition monitoring module 216 detects a delivery event condition relating to a message stream containing a series of discrete, sequentially received messages. The messages may form part of a same communication thread, and their delivery may have been halted while the module 216 monitored for the occurrence of a delivery event condition, as described earlier.

At block 504 of the method 500, the semantics-based message content consolidation module 220 may determine a subset of the messages in the message stream that are semantically similar to one another within a desired semantic similarity threshold.

In some example embodiments, the semantics-based message content consolidation module 220 may execute semantic processing on the message content of the received messages to calculate respective semantic similarity scores for each message pair. The module 220 may then determine the subset at block 504 as including those message pairs having corresponding semantic similarity scores within a threshold similarity value. In some example embodiments, each message in the identified subset may have a semantic similarity score with respect to each other message in the subset that is within the threshold similarity value. In other example embodiments, a given message may be included in the subset as long it has a semantic similarity score that is within the threshold value with respect to at least a threshold number of other messages in the subset.

Then, at block 506 of the method 500, the semantics-based message content consolidation module 220 may generate a consolidated message from the subset of messages identified at block 504. At block 508 of the method 500, the message digest generation module 218 may generate a consolidated message digest that includes the consolidated message generated at block 506 as well as one or more other messages from the received message stream that were not identified as part of the subset. For instance, the one or more other messages may include message(s) in the message stream that are not semantically similar enough to the other messages in the subset to justify their inclusion therein. Finally, at block 510 of the method 500, the message detection and delivery control circuit 200 (FIG. 2A) may send the consolidated message digest to an output device for presentation to an intended recipient of the message stream.

In some example embodiments, there may be multiple threshold similarity values (or ranges of values) that dictate the nature of the consolidation performed at block 506. For instance, if each message in the subset identified at block 504 has a semantic similarity score that is within a first threshold similarity value with respect to each other message in the subset (or with respect to some threshold number of other messages in the subset), then consolidation at block 506 may include selecting only the content of a single one of the messages that satisfy the first threshold similarity value with respect to one another to include in the consolidated message. The first threshold similarity value may represent a closest level of similarity between the messages in the subset.

To illustrate this scenario, assume that a set of responses received in a group chat conversation to a question posed by one of the participants all have essentially the same semantic meaning. In this scenario, one of the responses may be selected as being representative of all responses, and the remaining responses may be discarded when generating the consolidated message. As a non-limiting example, assume that the following question is posed in a group chat conversation: "is everyone OK with restaurant X for dinner?" Further assume that the following responses are received: user 1: "sounds good"; user 2: "yes"; user 3: "cool with me"; user 4: [a graphical element representing a "thumbs up"]. It is clear that each of these responses has essentially an identical semantic meaning, in which case, one of the responses (e.g., "yes") may be selected for inclusion in the consolidated message generated at block 506, and the remaining messages may be discarded. This single consolidated and summarized response may further be attributed to all relevant respondents (e.g. user 1, user 2, user 3, user 4) to ensure context is retained to the receiving user. This non-limiting example also illustrates that 1) semantic meaning can be ascertained/derived from non-text message content including, without limitation, graphical content, audio/video content, image content, and so forth, and 2) semantic similarities can be determined between different types of content (e.g., graphical content vs. text content).

In some example embodiments, messages in the subset identified at block 504 may have semantic similarity score(s) with respect to one another that are not within the first threshold similarity value, but which are within a second threshold similarity value indicative of a lesser degree of similarity between the messages. In such example embodiments, while some of the content of the messages may be redundant or essentially identical in semantic meaning, other portions of the content may be sufficiently dissimilar in semantic meaning that discarding such portions would result in loss of information. In such example embodiments, semantic similarity scores may be calculated within respect to portions of the messages. That is, multiple semantic similarity scores may be calculated for each message in the subset with respect each other message. For example, a respective semantic similarity score may be calculated for each unit portion of a message (e.g., each word, phrase, sentence, etc.) with respect to each unit portion of each other message. Then, in some example embodiments, when forming the consolidated message at block 506, the module 220 may include, in the consolidated message, respective portions of the messages that have semantic similarity scores that are within the second threshold similarity value (but not the first threshold similarity value), but retaining a representative message portion among those portions that are within the first threshold similarity value and discarding the other semantically redundant portions.

It should be appreciated that the above-described techniques for generating the consolidated message at block 506 are illustrative and not exhaustive. It should further appreciated that the semantic similarity scores may be calculated using any of a number of known similarity algorithms including, without limitation, a Euclidean distance, a Manhattan distance, a Minkowski distance, a cosine similarity, a Jaccard similarity, or the like. In addition, in some example embodiments, the semantic similarity scores may be weighted based on various factors such as the amount of content in a message, whether an urgent label has been applied to a message, the use of idioms or slang in the message, etc.

Figure 6:
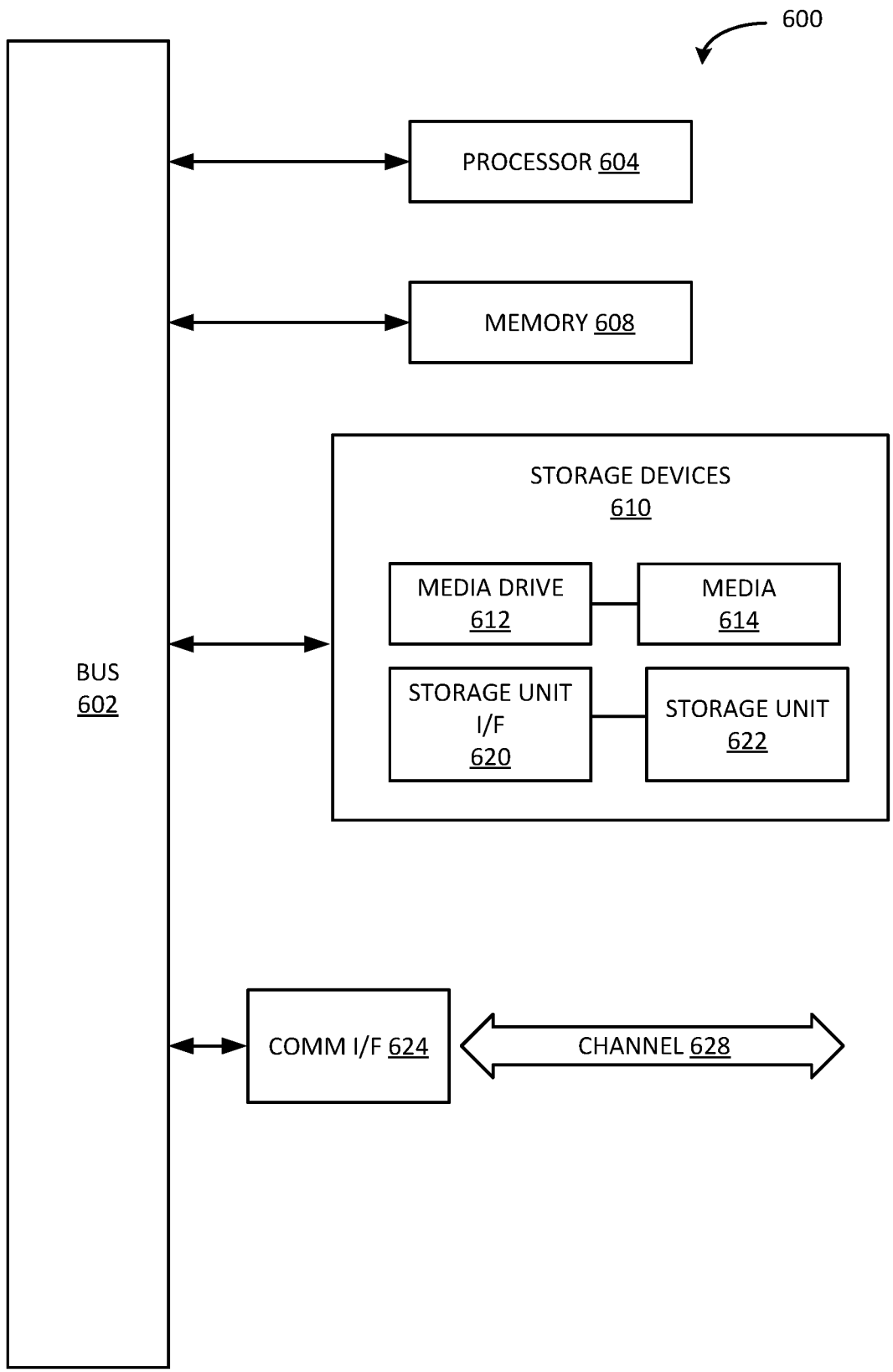
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 606, the processor 206 (FIG. 2A), or the like. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608, which may, in example embodiments, include the memory 208 (FIG. 2A). For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
   at least one memory storing machine-executable logic; and
   at least one processor configured to access the at least one memory and execute the machine-executable logic to:
     halt delivery of a plurality of messages making up a message stream while monitoring for a delivery event condition, the plurality of messages including a first message;
     detect the delivery event condition at least in part by:
       determining a time of receipt of the first message;
       detecting, during a first threshold period of time since the time of receipt of the first message, a signal indicative of intended communication of a second message subsequent to the first message;
       determining that a second threshold period of time has elapsed since a time of receipt of an initial message of the plurality of messages; and
       determining, responsive to the second threshold period of time elapsing, that the second message has not been received;
     consolidate content of the plurality of messages into a message digest responsive, at least in part, to detection of the delivery event condition;
     receive the second message prior to sending the consolidated message digest to an output device; and
     exclude content of the second message from the consolidated message digest; and
     send, while the signal indicative of intended communication of the second message continues to be received, the consolidated message digest to an output device for presentation of the content of the plurality of messages via the output device.

* * * * *